United States Patent [19]

Mehus

[11] Patent Number: 4,462,425
[45] Date of Patent: Jul. 31, 1984

[54] BACKFLUSHING SYSTEM

[75] Inventor: Richard J. Mehus, Minneapolis, Minn.

[73] Assignee: Economics Laboratory, Inc., Saint Paul, Minn.

[21] Appl. No.: 283,022

[22] Filed: Jul. 13, 1981

[51] Int. Cl.³ ............................................. F16K 11/10
[52] U.S. Cl. ............................. 137/624.18; 119/14.18; 134/56 R; 134/99; 134/171; 137/869
[58] Field of Search .................. 119/14.18; 134/56 R, 134/57 R, 96, 98, 99, 166 R, 171; 137/624.14, 624.18, 863, 869

[56] References Cited

U.S. PATENT DOCUMENTS

| | | | |
|---|---|---|---|
| 1,732,702 | 10/1929 | Tannehill | 137/624.18 |
| 2,030,394 | 2/1936 | Pierce | 137/624.18 X |
| 2,680,445 | 6/1954 | Hemminger | 134/171 X |
| 2,703,068 | 3/1955 | Hodsdon . | |
| 2,708,448 | 5/1955 | Reeve . | |
| 3,099,277 | 7/1963 | Maehans . | |
| 3,307,580 | 3/1967 | Alfieri et al. | 137/624.18 |
| 3,385,265 | 5/1968 | Schrader . | |
| 3,461,845 | 8/1969 | Peterson . | |
| 3,506,034 | 4/1970 | Branton . | |
| 3,726,253 | 4/1973 | Duncan . | |
| 4,034,713 | 7/1977 | Umbaugh . | |
| 4,034,714 | 7/1977 | Umbaugh et al. . | |
| 4,061,504 | 12/1977 | Zall et al. . | |
| 4,149,489 | 4/1979 | Umbaugh et al. . | |
| 4,168,677 | 9/1979 | Brown . | |
| 4,174,721 | 11/1979 | Wuchse . | |
| 4,222,346 | 9/1980 | Reisgies | 119/14.18 |

FOREIGN PATENT DOCUMENTS 45-27929 9/1970 Japan ............................. 137/624.18

Primary Examiner—Gerald A. Michalsky
Attorney, Agent, or Firm—Merchant, Gould, Smith, Edell, Welter & Schmidt

[57] ABSTRACT

A backflushing system capable of being used with an automatic milking device is the subject of this patent application. The system includes a control cam (54) which can be moved linearly to effectuate the various functions. The cam (54) has formed thereon a plurality of lands (65, 66, 68, 70) which operate various actuators (92, 94, 96). The various flushing functions and operation of a fail-safe valve (30) are governed by the actuators (92, 94, 96). In a preferred embodiment, the cam (54) is movable in both forward and reverse directions and is so controlled by a toggle switch (72), movable between two positions, which operates a two position, five way regulation valve (58).

6 Claims, 10 Drawing Figures

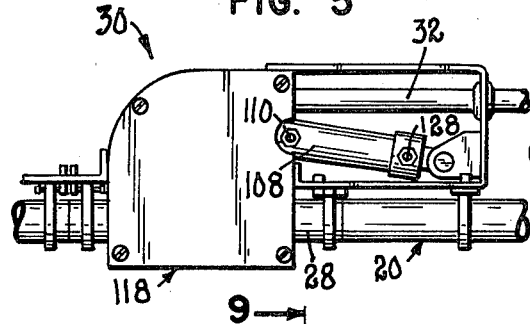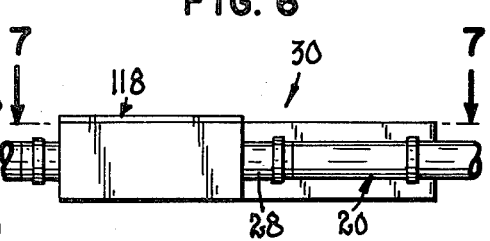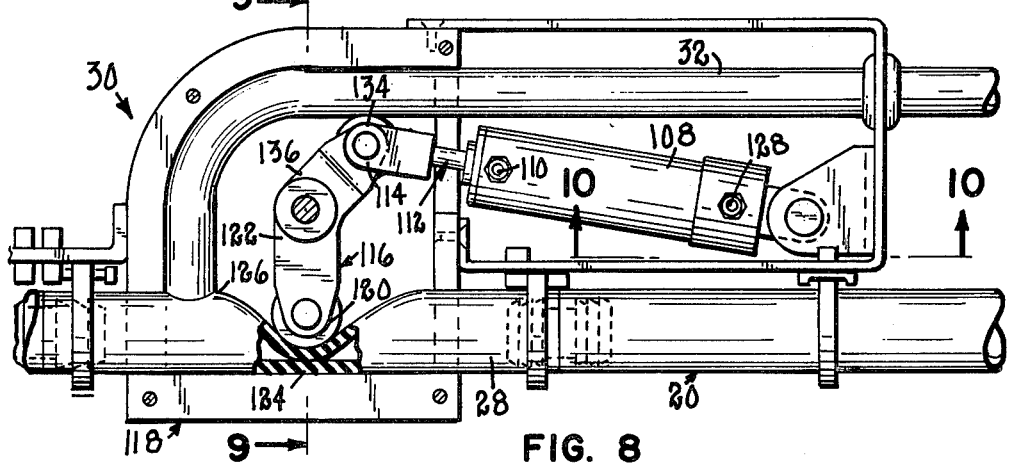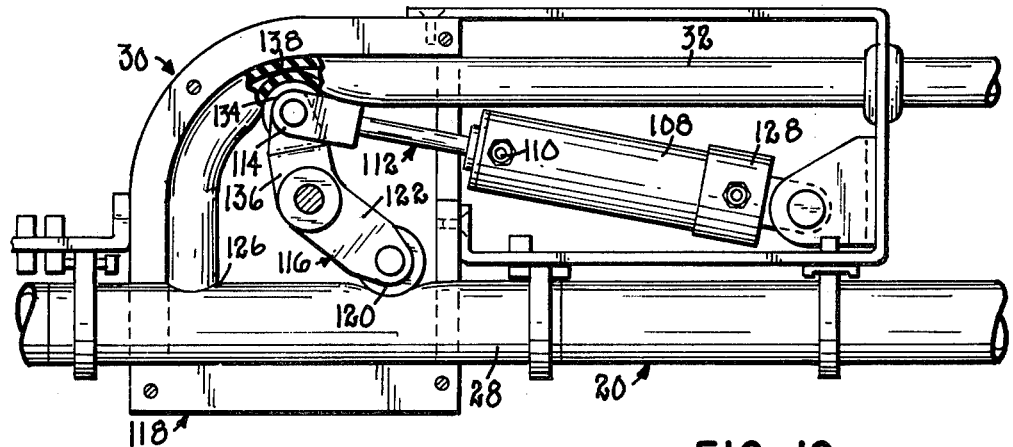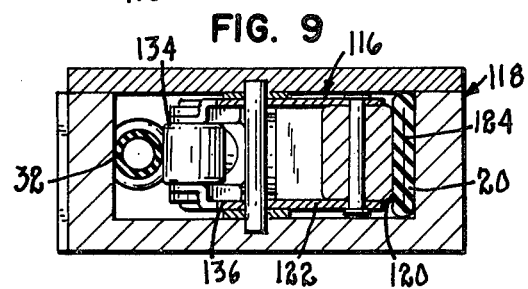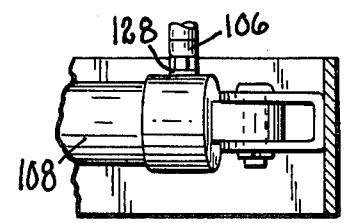

BACKFLUSHING SYSTEM

TECHNICAL FIELD

The invention of this application refers broadly to the field of systems for governing the actuation of valves and flushing fluid flow through backflushing conduits in apparatus for receiving and transferring fluid through a main flow line. More narrowly, however, the invention is directed to a control device for actuating valves which initiate flow of a sanitizer or other backflushing agent through a flushing conduit which intersects a main fluid flow line, and for occluding flow through the main flow line down-flow of the intersection of the flushing conduit with the main line when flushing agent is permitted to flow into the main line. In a preferred embodiment, the system is used in combination with an automatic milking device in which milk drawn from a cow is transferred through a main milk flow line to a receiving and storage tank, and wherein a sanitizing agent is introduced into the main milk line to flush the milking claw which is attached to the cow's udder in order to destroy microorganisms which infect cows to which the milking claw is subsequently attached after being used on a cow having a disease such as mastitis.

BACKGROUND OF THE INVENTION

In fluid transfer systems, it is frequently necessary to flush the input end of the system to cleanse that end from filtered impurities, infectious bacteria, or other substances which might tend to contaminate the system. Such systems typically include an assembly for conducting a fluid from the input end to an output end, to a collection or receiving tank and through a main fluid flow line. In such systems, a flushing conduit intersects the main fluid flow line proximate the input end. A flushing agent such as water or sanitizing agent is introduced into the main line through the flushing conduit in order to flush out the contaminating substance.

Illustrative of such a system is an automatic milking device which is typically used on dairy farms. Such a system has, at its input end, a milking claw which has a plurality of teat cups, each of which is attachable to one of the teats of a cow's udder. Vacuum is applied to the cups to draw milk from the udder and into the main milk flow line. The main line, thereafter, conducts the milk to a receiving, holding, or storage tank.

Flushing is desireable with this kind of system because of a condition known as mastitis. This condition is caused by a microorganism known as the streptococcus hemolyticus and can be prevalent among the cows of a dairy herd. The condition spreads fairly easily among the herd and is transmitted from one cow to another when the milking claw of an automatic milking machine is attached to the udder of a healthy cow after being used on a cow infected with mastitis.

A number of strains of mastitis are known. One particular strain, although affecting the cows in a cattle herd, has no effect on humans. Milk from a cow infected with this strain may, therefore, yet meet standards for human consumption and can be allowed to flow into a storage tank containing milk to be pasteurized and processed in other manners for human consumption.

Another strain can, if ingested by humans, cause septic sore throat. Even when a number of cows in a diary herd are infected with this strain, however, it is necessary to draw milk from the infected cows at regular intervals. Typically, the easiest way that this can be accomplished is by milking the infected cows at the same intervals as are milked the healthy cows. The milking can even be accomplished using the same automatic milking device in the case of both healthy and infected cows.

Milk drawn from an infected cow cannot, of course, be allowed to flow into the tank in which is stored milk to be processed from human consumption. Intermingling can be prevented by disconnecting the output end of the main milk flow line from the tank whenever the milking device is attached to the udder of an infected cow.

Such methods prevent contamination of the wholesome milk, but the problem of transmitting mastitis from an infected cow to a healthy cow remains. In order to preclude transmission of the disease, the milking claw is flushed after completion of use on a particular cow. Various solutions and sanitizing agents can be used for this purpose. Typically, the claw is first flushed by allowing water to flow through the flushing conduit and out through the claw, and then flushing the claw with a sanitizing agent. Prior to attaching the claw to the next cow to be milked, it is again flushed with water so that none of the sanitizing agent will be allowed to contaminate the wholesome milk.

During backflushing operations, the main milk flow line is closed off so that flushing fluid introduced through the flushing conduit into the main line can flow only in the direction of the milking claw and out through the teat cups.

Prior art structures have been designed to accomplish flushing of the milking claw as desired. One such structure is shown and described in U.S. Pat. No. 4,168,677 issued to Michael J. Brown on Sept. 25, 1979. This patent is for a Sanitary Backwashing System for Automatic Milking Machines. The structure of that patent includes a three-way control valve which is mounted in the main flow conduit. The control valve includes a movable valve core disposed within the interior of the valve housing. The core includes a network of passageways, and it is rotatable to align various of the passageways as desired to effectuate fluid flows in a particular manner. A main passageway extends through the valve and can be aligned with up-flow and down-flow portions of the main milk flow line to complete a discontinuity in the main line. With the valve in this position, milk drawn from a cow by the milking claw will be transferred directly to a collection tank. When the core is rotated 90 degrees in one direction, alignment of passageways is such that flushing agents can flow from their various reservoirs to the milking claw. With a particular alignment of passageways designed to accomplish this function, a downflow portion of the main milk line will be occluded so that milk in the collection tank cannot become contaminated by the various agents.

The structure of that patent does not, however, provide any means for positively stopping off flow through the down-flow portion of the main milk line when the sanitizing agent is accomplishing flushing. Consequently, if the core were rotated 90 degrees in the wrong direction, the sanitizing agent could, conceivably, flow directly to the wholesome milk thereby contaminating it.

Additionally, the structure of that patent includes a sophisticated sequencing device for regulating the flow of water and sanitizing solution to the milking claw.

Because of the intricacy of the sequencing system, more opportunities exist for malfunctioning of the various flushing functions.

It is to these deficiencies in the art that the invention of the present application is directed. The backflushing system of this application both positively precludes contamination of wholesome milk stored in a tank in which it is received, by the flushing agents and, simultaneously provides a simple mechanical sequencing system which virtually precludes malfunction.

SUMMARY OF THE INVENTION

The invention of the present application is a device for controlling flushing of the up-flow end of a main fluid flow line by flushing agents such as water or an iodine solution introduced into the main line through a flushing conduit intersecting the main line. Typical of a fluid transfer system wherein flushing is desireable is an automatic milking apparatus having a milking claw at the up-flow end of the line and a milk receiving tank at the down-flow end of the line. The flushing conduit intersects the main line proximate the milking claw, and a flushing agent or agents, normally stored in a reservoir from which the flushing conduit extends, can, through the flushing conduit, be introduced into the main line proximate its up-flow end. The control device includes an element which obstructs flow of the flushing agent through the conduit. The element includes an actuation member configured for movement between two positions. When the actuation member is in a first or open position, flow of the flushing agent through the flushing conduit is permitted, and flushing of the up-flow end of the main fluid flow line can be effected. When the actuation member is in its second or closed position, flow through the conduit is obstructed. The actuation member is normally biased to its second position. Cam means are provided to initiate movement of the actuation member from its second position to its first position. As the cam member moves, a first projection engages the actuation member and urges it to its first position. As movement of the cam means continues, the projection becomes disengaged from the actuation member, and the actuation member returns to its second position.

In a preferred embodiment, wherein more than one flushing agent is used in sequence to effect the flushing function, a plurality of regulatable valves, each having an actuation member, can be provided to control the flow of the agents into the main fluid flow line. A preferred structure incorporates a cam having a plurality of lands, each corresponding to a sequenced discharge of one of the flushing agents. One such cam extends linearly and generally transversely to a direction of movement of the actuators of the regulatable valves. The cam can be disposed for movement along the axis of its extension.

As the cam moves, a first land can engage the actuator of a first valve which regulates the flow of an agent such as rinse water. The actuator is, thereby, moved to its first position to initiate flow of the agent through the flushing conduit and into the main fluid flow line. The period of discharge of the agent will depend upon the dimension of the land along the direction in which the cam moves.

After the first land becomes disengaged from the actuation member of the first valve, a second land, positioned along the cam, can engage the actuation member of a second regulatable valve for controlling the flow of an agent such as an iodine sanitizing solution. As the acutator of the second valve is engaged, it is urged to its first position to initiate flow of the iodine solution through the flushing conduit and into the main fluid flow line. As with the first land, the dimension of the second land in the direction along which the cam moves, along with the speed of the cam will govern the period of time during which flow of the agent controlled by the second valve will occur.

A third land can be positioned along the cam so that, after the second land becomes disengaged from the actuator of the second valve, it will engage the actuator of the first valve to effect rinsing of the system of the iodine solution. The lengths of the first and third lands along the direction of movement of the cam can be significantly shorter than the length of the second land in that direction. This is so since the flushing accomplished during the second sequenced discharge is the primary flushing, and rinse flushing can be used to merely cleanse the system of the primary flushing agent.

The cam can be provided with a fourth land which can be made to engage an actuator for a valve which controls flow of fluid to a fluid cylinder. The fluid cylinder can include a rod extending from a piston disposed for axial movement within the cylinder. The rod can be pivotally attached to a pinching element which has a pair of arms. The arms alternately pinch closed the main fluid flow line and the flushing conduit. That is, the pinching element can be pivotally mounted so that, when in a first position, one of the arms pinches closed the main flow line while the flushing conduit remains unoccluded. When the fluid cylinder effects axial movement of the piston and the attached rod, the pinching element will be caused to rotate to a second position wherein the second arm pinches closed the flushing conduit and the main line is open to flow therethrough.

The actuator for the fluid cylinder control valve is normally biased to its second position. When the fourth land urges it to its first position, the pinching element is caused to be rotated from its second position to its first position. The fourth land can be made having a dimension in the direction in which the cam moves such that the actuator of the fluid cylinder control valve is in its first position for at least the period during which sequencing is accomplished by the first, second, and third lands. The main fluid flow line is, thereby, occluded throughout flushing operations.

As previously mentioned, one of the factors affecting the period of time during which discharge of a flushing agent will occur is the speed of the movement of the cam. Means can be provided for regulating this movement. The control device can include an adjustable needle valve to accomplish this metering.

The control device of this application is, thus, simple in nature and designed to solve a number of problems existent in the prior art. More specific advantages of the invention will become apparent with the reference to the DETAILED DESCRIPTION OF THE INVENTION, CLAIMS, and the appended DRAWINGS.

BRIEF DESCRIPTION OF THE DRAWINGS

FIG. 5 is a side elevational view of a fail-safe valve;

FIG. 6 is a bottom plan view of the fail-safe valve of FIG. 5;

FIG. 7 is an enlarged view taken generally along the line 7—7 of FIG. 6 showing the pinching element in its first position, some portions of the fail-safe valve being shown broken away;

FIG. 8 is a view similar to that of FIG. 7 showing the pinching element in its second position, some portions of the fail-safe valve being shown broken away;

FIG. 9 is a view taken generally along the line 9—9 of FIG. 7; and

FIG. 10 is a view taken generally along the line 10—10 of FIG. 7.

DETAILED DESCRIPTION OF THE INVENTION

Figure 1:
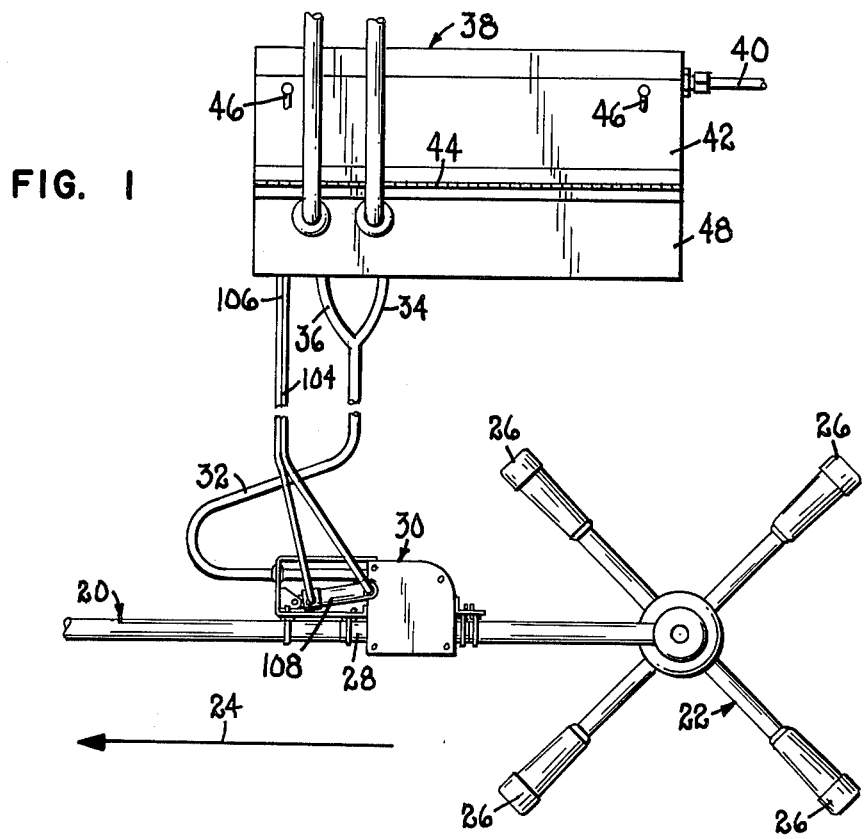
FIG. 1 is a diagrammatic view showing the control device of this application, a main fluid flow line having a milking claw at its input and, a flushing conduit, and a fail-safe valve for pinching off the main fluid flow line and the conduit when it is desired that fluid flow through each be precluded.
Figure 3:
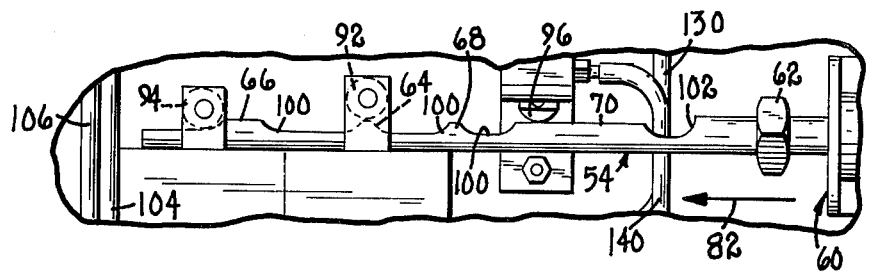
FIG. 3 is an enlarged fragmentary view showing the cam in its first position.
Figure 4:
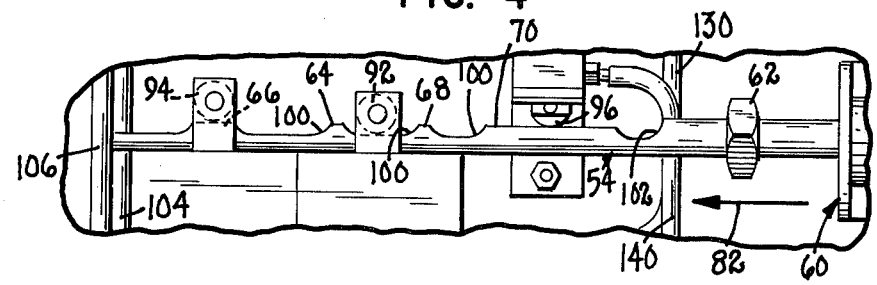
FIG. 4 is an enlarged fragmentary view showing the cam in its second position.

Referring now to the drawings wherein like reference numerals denote like elements throughout the several views, FIG. 1 illustrates a system in accordance with the invention of the present application. For purposes of illustration, the system shown in the Figures is shown as used with an automatic milking device. Such a device typically includes a main milk transfer line 20 through which milk flows from a milking claw 22, through the line 20 in a direction as indicated by arrow 24, to a receiving container (not shown). The milking claw 22 has a plurality of teat cups 26, each for attachment to a teat on the udder of a cow to be milked. Vacuum is applied to each of the teat cups 26 to draw the milk from the cow, and a second vacuum source effects transfer of the milk from the claw 22, through the main milk transfer line 20, and to the receiving tank.

A resilient main milk transfer line insert 28 can be interposed in a discontinuity in the main milk line 20 and be held in the discontinuity in any appropriate manner. The insert 28 forms a part of a fail-safe valve 30 which precludes flow of milk or any fluid through the main milk line 20 in the direction of arrow 24 when a flushing or sanitizing agent is introduced into the up-flow or intake end of the line 20 through a resilient flushing conduit 32. Contamination of milk having been transferred to the receiving and collection tank is, thereby, precluded.

The flushing conduit 32 can have an input of one of a number of flushing agents which pass from an agent reservoir (not shown) to the flushing conduit 32 through transfer ducts 34, 36. The ducts 34, 36 enter a control cabinet 38 in which flow through the ducts 34, 36 is regulated.

The control cabinet 38 has an inlet line 40 through which a control fluid such as pressurized water enters the cabinet 38. The cabinet 38 can have an access door 42 hinged as at 44 for providing ingress to the interior of the cabinet 38. The door 42 can be provided with locking tabs 46 for maintaining it closed.

Figure 2:
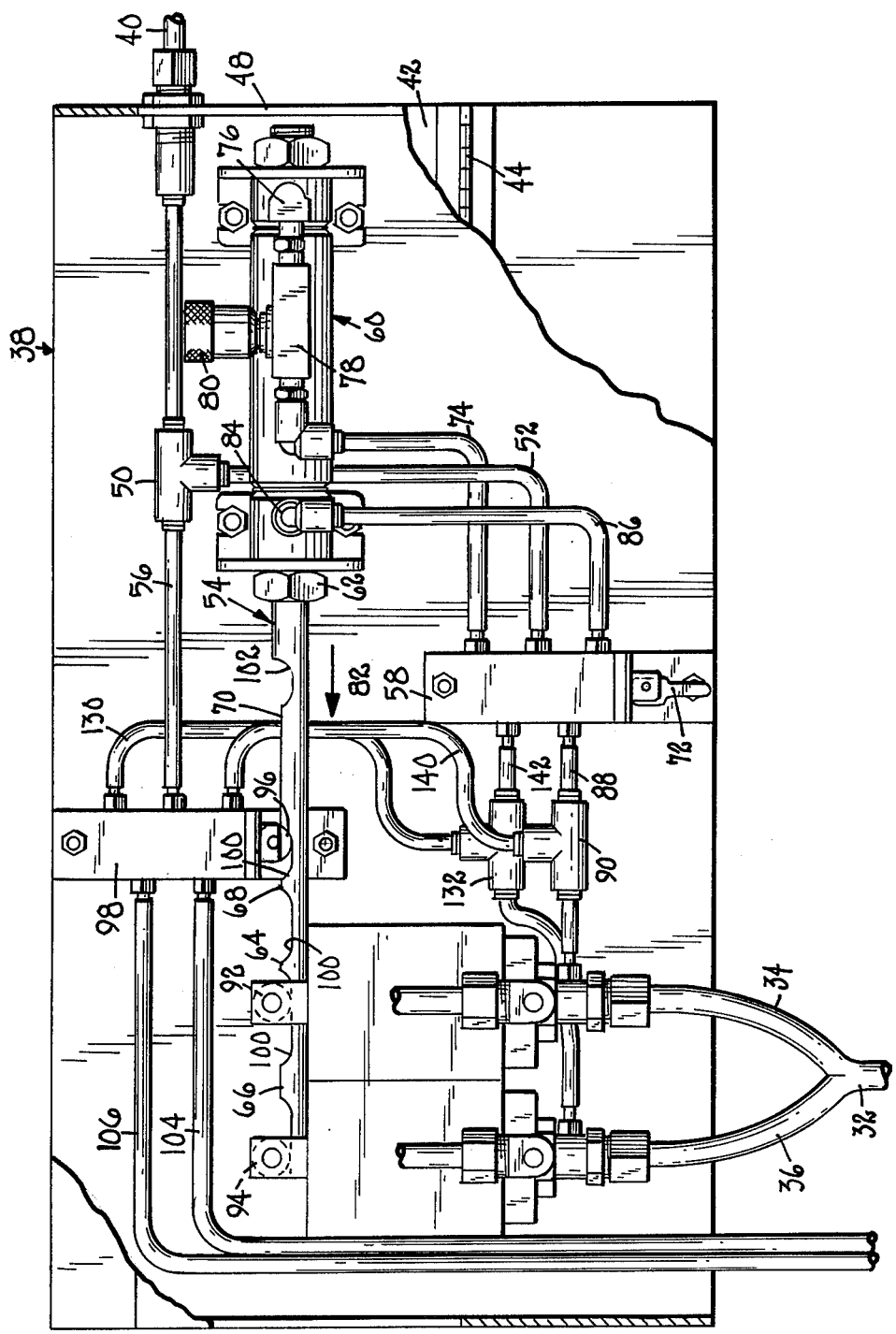
FIG. 2 is an elevational view of the control device of the present application.

Referring now to FIG. 2, the interior of the control cabinet 38 is illustrated. Control water flowing through the inlet line 40 passes through a lateral wall 48 of the cabinet and into an interior continuation of the line. Control water flow is split by a tee 50 inside cabinet 38. A portion of the control water passes into a first branch passageway 52 for effectuating movement of a control cam 54, and a portion passes into a second branch passageway 56 which controls the operation of the fail-safe valve 30.

That portion of the control water which passes through the first branch passageway 52 passes through a first two position, five way regulation valve 58 which determines the side of a piston of a first fluid cylinder 60, to which the control water will be directed. The first fluid cylinder 60, in turn, governs the direction in which the linear control cam 54 will be driven. The cam 54 is operatively attached to the piston, which moves axially within the fluid cylinder 60, by any appropriate means. A nut 62 by which the cam 54 can be attached to a rod extending from the piston is shown in FIG. 2.

The cam 54 includes a plurality of lands. For purposes of subsequent description, these lands are identified as a first land 64, a second land 66, a third land 68, and a fourth land 70.

As shown in FIG. 2, the cam 54 is in a retracted position with nut 62 engaging one end of the cylinder 60 to preclude further rightward movement. With the cam 54 in this position, a toggle switch 72 can be manipulated to direct flow of control water from the first branch passageway 52 into a channel 74 providing communication, through a fluid transfer port 76, into the fluid cylinder 60 on a right side of the piston. As seen in FIG. 2, a needle valve 78 is interposed in this channel 74. The needle valve 78 is of a construction known in the art and is used to regulate the rate of fluid flow through the channel 74. A knurled control knob 80 can be provided to regulate the needle valve 78.

Flow of control water through the fluid transfer port 76 entering into the cylinder 60 on the right side of the piston will cause movement of the piston to the left as viewed in FIG. 2. This movement will effectuate movement of the cam 54 in a forward, or leftward, direction as indicated by arrow 82.

Fluid driven from the left chamber of the cylinder 60 will exit through a second fluid transfer port 84 and into a channel 86, through the two position, five way regulation valve 58, through an exhaust conduit 88 having a tee check valve 90 therein, and be exhausted into the flushing conduit 32 through transfer duct 34. As will be described here-in-after, when movement of the cam 54 is initiated, a flushing fluid will flow through one of the transfer ducts 34, 36 merging into the flushing conduit 32, and the exhausted control water will pass into the up-flow end of the main milk line 20 and out through the milking claw 22 along with the flushing agent.

The lands 64–70 of the linear cam 54 effectuate movement of various actuator detents for controlling functions of the backflushing system. A first actuator 92 controls operation of a first valve means. The valve means regulates flow of a first agent such as rinse water into the flushing conduit 32.

The second actuator 94 controls operation of a second valve means. This valve means regulates flow of a second agent such as an iodine sanitizing solution into the flushing conduit 32.

The third actuator 96 controls the positioning of a second two position, five way regulation valve 98 which governs operation of the fail-safe valve 30.

All three actuators 92–96 are biased to second positions, or lower positions as viewed in FIG. 2. Biasing can be effectuated by gravity or positive biasing means. The actuators 92–96 are urged to their first positions, or upper positions as viewed in FIG. 2, only when engaged by one of the lands or projections 64–68 carried by the linear cam 54. The cam 54 includes notches 100 between the various lands 64–70, into which notches 100 the actuators 92–96 are received when not engaged by one of the lands 64–68.

An extreme rightmost notch 102 is provided in the cam 54 to allow movement of the actuator 96 of the second two position, five way valve 98 downward to its second position when the cam 54 moves to its extreme left swing.

When the first regulation valve 58 is disposed to effect flow of control water through the channel 74, as previously described, in order to introduce fluid on the right side of the piston of the fluid cylinder 60, movement of the cam 54 in a forward direction is initiated. Because of the positioning of the lands 64–70 along the cam 54, the first land 64 will urge the first actuator 92 from its second position to its first position to initiate flow of the first agent such as rinse water through its transfer duct 34 and into the flushing conduit 32. As can be seen in the figures, the dimension of the first land 64 in a direction of movement of the cam 54 is relatively small, and the period of time during which rinse water will be allowed to flow through the flushing conduit 32 will be relatively short. The period of time during which rinse water flows is, of course, also a function of the speed of movement of the cam 54 as determined by the rate of flow of control water into the fluid cylinder 60 as regulated by the needle valve 78.

The location of the cam 54 wherein the first land 64 urges the first acutator 92 to its first position defines a first cam position. As movement of the cam 54 continues to the left beyond this first cam position, the second land 66 will engage the second actuator 94 and urge it to its first position. By this time, however, the first land 64 has passed the first actuator 92 and allowed it to return to its second position. The location of the cam 54 wherein the second land 66 urges the second actuator 94 to its first position defines a second cam position. With the cam 54 in its second position, a second flushing agent such as an iodine sanitizing solution will be allowed to flow through the second transfer duct 36 and into the flushing conduit 32.

The dimension of the second land 66 in a direction of movement of the cam 54 is larger relative to that same dimension of the first and third lands 64, 68. Consequently, assuming constant speed of movement of the cam 54 in its forward direction, the period during which the second flushing agent is allowed to flow into the flushing conduit 32 will be greater than that during which the first flushing agent is permitted to flow into the flushing conduit 32.

As movement of the cam 54 in a leftwardly direction continues, the second land 66 will disengage from the second actuator 94, and the third land 68 will engage the first actuator 92. A flow of the first flushing agent will, thereby, be again induced in the flushing conduit 32. The location of the cam 54 wherein the third land 68 urges the first actuator 92 to its first position defines a third cam position.

As has already been indicated, the period of time during which any particular flushing function will continue is a function of both speed of movement of the cam 54 and the dimension of the particular controlling land in the direction in which the cam 54 moves. It has been found appropriate to flush a milking claw 22 of an automatic milking system with flushing water during the first sequenced function for approximately seven and one half seconds, with an iodine sanitization solution during a second sequenced function for approximately 30 seconds, and again with flushing water during a third sequenced function for approximately seven and one half seconds. Consequently, second land 66 should have a dimension in the direction in which the cam 54 moves approximately four times that of the first and third lands 64, 68. Because of the desirability of limiting the size of the cam 54, one embodiment of the back-flushing system utilizes a cam 54 having a second land 66 with a dimension in the direction of cam movement of one half inch and first and third lands 64, 68 having a dimension in the direction of cam movement of one eighth inch. With the lands so dimensioned, flow of control water through the needle valve 78 can be adjusted by manipulation of control knob 80 so that the cam 54 moves at a rate of one inch per minute.

When the cam 54 becomes fully extended to its leftmost swing, neither the first nor second actuators 92, 94 is in its first position. The first actuator 92 will be seated in the notch 100 between the third and fourth lands 68, 70, and the second actuator 94 will be seated in the notch 100 between the first and second lands 64, 66.

Because of the location of the third actuator 96 with respect to the fourth land 70 prior to initiation of movement of the cam to the left, and because of the dimension of the fourth land 70 in the direction in which the cam 54 moves and relative to the distance between the first and third lands 64, 68, the third actuator 96 will be urged to its first position throughout the time during which the first and second actuators 92, 94 are in their first positions. With the third actuator 96 in its first position, the second two position, five way control valve 98 will allow flow of the control water through a first 104 of two fail-safe valve ducts 104, 106. Flow through this duct 104 will enter a second fluid cylinder 108 through a fluid port 110 on the left, as viewed in FIGS. 7 and 8, of a piston disposed for axial movement within the cylinder 108. The piston has an actuation rod 112 extending therefrom, a remote end 114 of the actuation rod 112 being attached to a pinching element 116 disposed within the housing 118 of the fail-safe valve 30, and at a location on the pinching element 116 spaced from an axis about which the element 116 rotates. As best seen in FIG. 7, introduction of control water into the fluid transfer port 110 communicating with the left chamber of the second fluid cylinder 108 will cause the pinching element 116 to be rotated in a clockwise direction, as viewed in that figure. A remote end 120 of a first arm 122 of the pinching element 116 will, with the element 116 in this first position thereof, pinch closed the main milk transfer line 20 at a point 124 downflow from the intersection 126 of the flushing conduit 32 with the main milk line 20. Because of the relative sequencing of actuation of the third actuator 96 with respect to actuation of the first and second actuators 92, 94, this occlusion of the main milk line 20 will occur before any flushing agent is passed through the flushing conduit 32 and into the main milk line 20 proximate the milking claw 22.

As the piston in the second fluid cylinder 108 is driven to the right, control fluid in the right chamber will exit through a second fluid port 128 and pass through a second fail-safe valve duct 106 back to the second two position, five way control valve 98. The valve 98 will direct this exhaust fluid through a line 130 to a second tee 132. A check valve within tee 132 will preclude back-flow of this exhaust fluid and will insure elimination of the water into one of the flushing agent transfer ducts 34, 36 for exhaust with the flushing agent.

When the cam 54 moves to its extreme left position so that the third actuator 96 is received in the right most notch 102 allowing the third actuator 96 to return to its second position, flow through the second regulation valve 98 will be such that control water is directed to the second fluid port 128 of the second cylinder 108. With flow so channeled, the piston will be urged leftwardly causing rotation of the pinching element 116 in a counterclockwise direction to a second position. With the actuation rod 112 of the cylinder 108 fully extended and with element 116 in its second position, a remote end 134 of the second arm 136 of the pinching element 116 will completely close off flow through the flushing conduit 32 as at 138. With the pinching element 116 in this position, therefore, passage of any agent into the main milk line 20 will be precluded.

When pinching element 116 is being pivoted in its second position, that illustrated in FIG. 8, fluid on the left side of the piston of the second fluid cylinder 108 will be driven out through fluid port 110 and into the valve duct 104. With the third actuator 96 of regulation valve 98 in its second position (that is, in a position received in one of the notches 100, 102), return flow of control water through valve duct 104 will be directed to a second exhaust line 140. Exhaust of control water flowing through line 140 will pass through a one way check valve disposed within first tee 90 and be eliminated from the control system through transfer duct 34 and flushing conduit 32.

Positioning of lands 64–70 along the cam 54 can be such that, if means are provided to drive the cam 54 in a reverse direction (or rightward direction as viewed in FIG. 2), sequencing of the flushing functions and actuation of the fail-safe valve 30 will be symmetrical to those functions and actuation of the fail-safe valve which occur during forward movement of cam 54. As previously indicated, when cam 54 has attained its leftward most position during movement in its forward direction, third actuator 96 is received in notch 102. Actuation of the cam 54 in its reverse direction is initiated by flipping toggle switch 72 to a position opposite that which it occupies to initiate forward movement of the cam 54. With switch 72 in this second position, first regulation valve 58 is disposed so that flow of control water through first branch passageway 52 will be directed into second channel 86. Flow of the water will enter the left chamber of cylinder 60 through port 84. The piston disposed within cylinder 60 will, thereby, be driven to the right, causing cam 54 to be retracted.

Fluid in the right chamber of cylinder 60 will be exhausted through fluid port 76 and first channel 74. With regulation valve 58 in the second position, flow from channel 74 will be directed to a second exhaust conduit 142 and through tee 132. A one way check valve positioned in tee 132 will preclude backflow of exhausted control water into channel 74. Control water thus directed will be eliminated from the backflushing system through transfer duct 36 and flushing conduit 32.

Speed of movement of cam 54 can, again, be controlled during movement in its reverse direction. As with movement in a forward direction, control is effectuated by regulation of needle valve 78 by control knob 80. Speed control can be maintained since control water can be introduced into the left chamber of cylinder 60 through port 84 no faster than it can be exhausted from the right chamber through port 76 and channel 74.

Numerous characteristics and advantages of the invention of this application have been set forth in the foregoing description. It will be understood, however, that this disclosure is, in many respects, only illustrative. Changes may be made in details, particularly in matters of shape, size, and arrangement of parts without exceeding the scope of the invention. The invention's scope is defined by the language in which the appended claims are expressed.

What is claimed is:

1. Apparatus for sequentially controlling flow of water and sanitizing agent through a flushing conduit, into the main milk flow line of an automatic milking device, and out through a milking claw through which milk is drawn from a cow, comprising:
    (a) first valve means for regulating flow of rinse water into the flushing conduit, said first means including an actuator movable between a first position wherein rinse water is premitted to enter the conduit, and a second position wherein entry of rinse water into the conduit is precluded, and wherein said actuator is biased to its second position;
    (b) second valve means for regulating flow of sanitizing agent into the flushing conduit, said second means including an actuator movable between a first position wherein sanitizing agent is permitted to enter the conduit, and a second position wherein entry of sanitizing agent into the conduit is precluded, and wherein said actuator of said second means is biased to its second position;
    (c) a cam having first, second, and third lands, and being movable in a forward direction among a first position wherein said first land urges said actuator of said first valve means to its first position, said cam extends and moves generally linearly and transversely to a direction of movement of said actuators, a second position wherein said second land urges said actuator of said second valve means to its first position, and a third position wherein said third land urges said actuator of said first valve means to its first position;
    (d) means for driving said cam in said forward direction through its first, second, and third position consecutively;
    (e) wherein said actuator of said first valve means is in its second position when said cam is disposed in its second position, and wherein said actuator of said second valve means is in its second position when said cam is disposed in its first and third positions; and
    (f) wherein said cam is movable in a reverse direction, and further comprising means for driving said cam in said reverse direction through its third, second, and first positions consecutively.

2. Apparatus in accordance with claim 1 wherein said means for driving said cam in said forward and reverse directions comprises:
    (a) a first fluid cylinder having a piston disposed therein for movement in a direction generally aligned with the direction of movement of said cam, and fluid transfer ports formed therein, at least one of said ports being disposed on either side of said piston;
    (b) means operatively attaching said cam to said piston for movement therewith; and (c) fluid supply means for channeling fluid to said cylinder through said at least one port on a desired side of said piston.

3. Apparatus in accordance with claim 2 further comprising means for channeling fluid to a desired side of said piston.

4. Apparatus in accordance with claim 3 wherein said channeling means includes a toggle switch operated valve for channeling the fluid to the desired side.

5. Apparatus in accordance with claim 2 further comprising a tube channeling fluid for actuating said piston to said cylinder and means for selectively metering the rate of fluid flow through said tube.

6. Apparatus in accordance with claim 5 wherein said metering means comprises an adjustable needle valve.

* * * * *